United States Patent [19]
Spevack

[11] 3,933,995
[45] Jan. 20, 1976

[54] DUAL TEMPERATURE ISOTOPE EXCHANGE SYSTEM

[75] Inventor: Jerome S. Spevack, New Rochelle, N.Y.

[73] Assignee: Deuterium Corporation, White Plains, N.Y.

[22] Filed: Mar. 12, 1971

[21] Appl. No.: 123,815

Related U.S. Application Data

[63] Continuation of Ser. No. 828,926, July 16, 1959, abandoned, which is a continuation-in-part of Ser. No. 188,925, Sept. 29, 1950, Pat. No. 2,895,803.

[52] U.S. Cl.................................. 423/580; 423/563
[51] Int. Cl.² ............................................ C01B 5/02
[58] Field of Search................... 423/580, 648, 563

[56] References Cited
UNITED STATES PATENTS

| | | | |
|---|---|---|---|
| 2,787,526 | 4/1957 | Spevack | 423/580 |
| 2,895,803 | 7/1959 | Spevack | 423/580 |

*Primary Examiner*—Earl C. Thomas
*Attorney, Agent, or Firm*—Hall & Houghton

[57] ABSTRACT

Improvements in method for isotope concentration by dual temperature exchange between feed and auxiliary fluids in a multistage system, in a preferred embodiment of which the first fluid is a vaporizable liquid and the auxiliary fluid a gas, comprising steps for improving the heating and/or cooling and/or humidifying and/or dehumidifying operations.

10 Claims, 8 Drawing Figures

DUAL TEMPERATURE ISOTOPE EXCHANGE SYSTEM

This is a continuation of application Ser. No. 828,926, filed July 16, 1959, now abandoned, itself a continuation in part of my copending parent application Ser. No. 188,925, filed Sept. 29, 1950 (now U.S. Pat. No. 2,895,803 issued July 21, 1959), and relates to methods particularly but not exclusively adapted for the concentration of isotopes by the dual temperature exchange system which involves equilibrium exchange of a desired material between two substances at different temperatures.

In such systems, for instance, as disclosed in my copending application Ser. No. 509,581, filed Nov. 9, 1943, now U.S. Pat. No. 2,787,526, issued Apr. 2, 1957, a single stage system or each stage of a cascade employs a cold tower and a hot tower and the progress of the exchange reactions through the system has required alternate and repeated cooling and heating of the substances involved in a very costly manner. These temperature reversals taken with the humidity variations and loss of costly materials with the waste have constituted the outstanding factors in the operating costs and have been determinative of the practicability of the system.

The object of this invention is to provide improved systems for reducing such cost factors in a manner economizing on the energy to be supplied and greatly reducing the cost of operation while at the same time maintaining the rate and quality of output.

Figure 1:
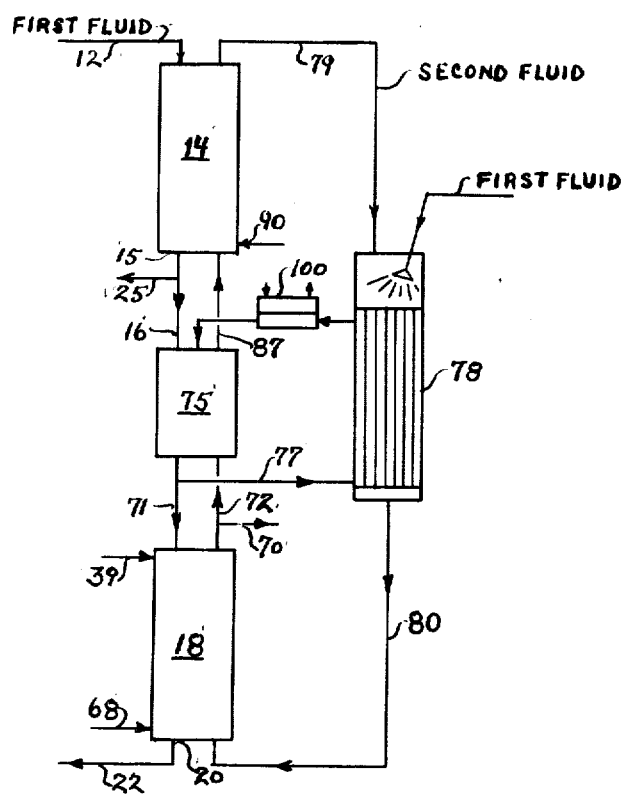
Figure 2:
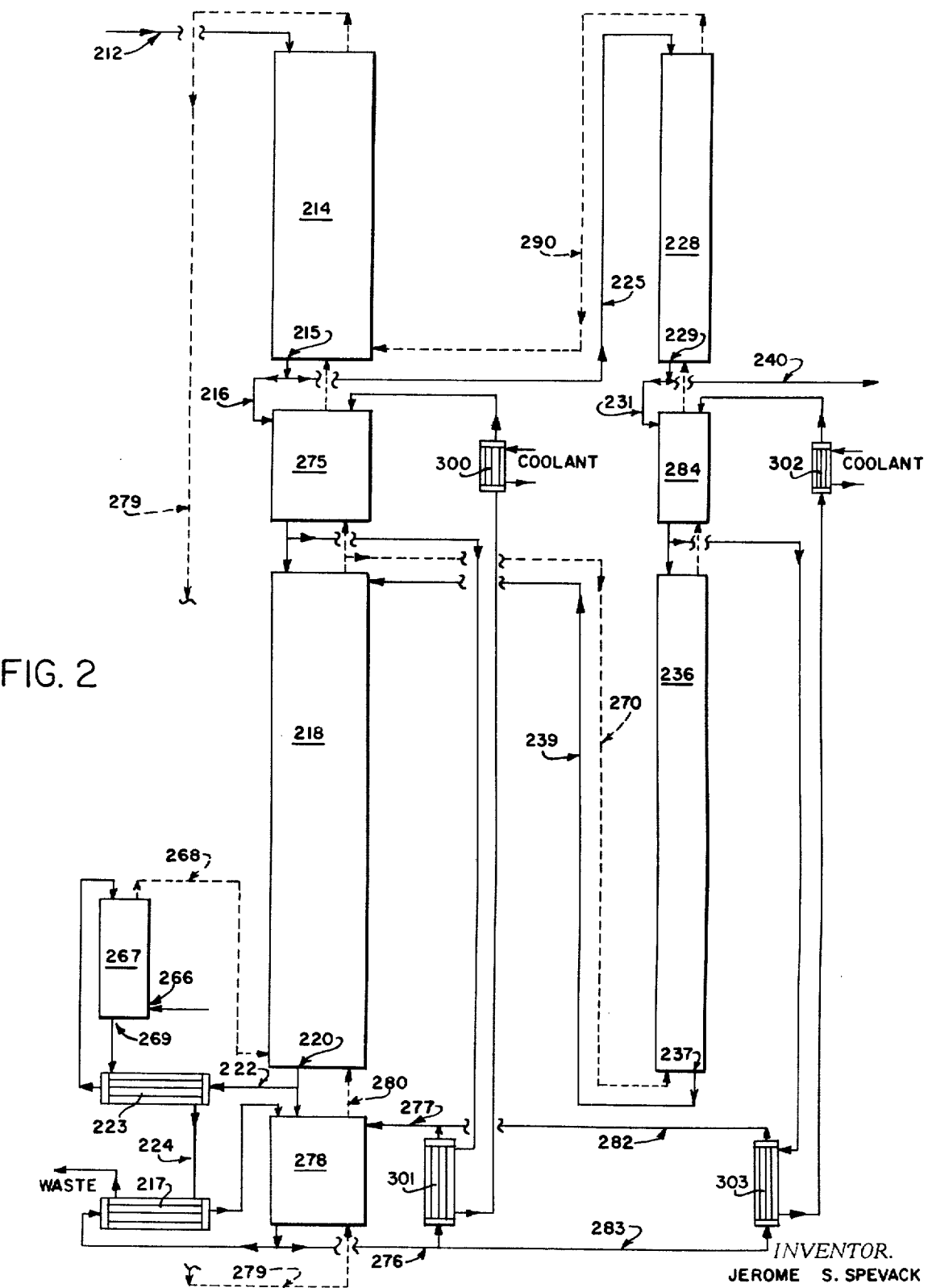

Further objects of the invention will appear from the following specification taken in connection with the accompanying drawings in which:

FIG. 1 shows diagrammatically an arrangement of the present invention described in my copending parent application and continued herein; and FIG. 2 shows diagrammatically a modification associated in an integrated cascade embodiment of a system of the class described in my copending parent application and continued in part herein.

The features of the present invention are typically illustrated in connection with the concentration of deuterium by countercurrent reactions at contrasting high and low temperatures. The reactants in this exemplary embodiment are hydrogen sulfide gas ($H_2S$) and liquid water ($H_2O$).

Both of these substances contain chemically different forms of hydrogen, which are capable of undergoing a reversible exchange reaction. In such a reaction an equilibrium is established between the light and heavy hydrogen isotopes. Since the mechanism of the exchange reaction is ionic, no catalyst is required.

The system at each stage makes use of two towers, a cold temperature tower and a hot temperature tower. The isotopic exchange reactions involved in this illustrative embodiment are:

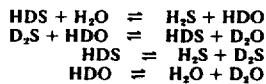

Equilibrium conditions favor concentration of the deuterium in the water phase with a greater concentration effect occurring at the lower temperature. Proper operation of the system gives rise to a concentration gradient in the towers and causes an accumulation, in this illustrative embodiment, of deuterium as heavy water at the bottom of the cold tower.

Feed water enters the system at the top of the cold tower, passes through the cold tower into the top of the hot tower, and leaves as waste from the bottom of the hot tower which waste may in turn be used as the supply to a separate subsequent system. Hydrogen sulfide gas is continuously recycled from the top of the cold tower to the bottom of the hot tower, always flowing countercurrent to the water. Suitable heat exchangers are provided to heat or cool the gas and liquid streams before their entry into the towers.

In each stage the cold tower acts as the concentrating tower. Inasmuch as equilibrium conditions favor the presence of deuterium in the water phase then as the water stream passes through the cold tower it beomes enriched in deuterium while the hydrogen sulfide stream becomes depleted. Depletion of deuterium in the gas stream continues to a point where at the top of the cold tower it approaches its equilibrium concentration with the feed water.

The function of the hot tower is the reverse of the cold tower. This tower acts as a deuterium stripper, and thereby provides deuterium reflux to the cold tower. Since the equilibrium constant at the hot tower temperature is not as favorable to deuterium concentration in the water, the water which has passed into the hot tower from the cold tower is obliged to return its excess deuterium to the hydrogen sulfide stream. This redistribution of deuterium from liquid to gas goes on through the entire length of the hot tower and continues to a point where at the bottom of the hot tower the water approaches its equilibrium concentration with the hydrogen sulfide. Therefore, since the quantity of deuterium entering with the hydrogen sulfide at the bottom of the hot tower is essentially the same as that which has left the top of the cold tower, and since the liquid and gas streams tend to approach equilibrium with each other at either end of the system, then the deuterium concentration in the water leaving the hot tower must be less than its concentration in the feed water which enters the cold tower.

By repeated operation, this mechanism causes a growing accumulation of deuterium at the bottom of the cold tower and thereby enables the continuous removal of a concentrated product.

In the arrangement of FIG. 1, pumps and valves are omitted for simplicity and the supply of first fluid, e.g. liquid ($H_2O$), enters the top of the cold tower 14 via conduit 12. As hereinafter explained, there is a countercurrent of second fluid, e.g. gas ($H_2S$), passing upward in this tower 14, the temperature of this cold exchange reactor being maintained at about 20°C., for instance, at a pressure of 5 atmospheres.

The cold liquid discharged at 15 at the bottom of the tower may be divided, at least one portion going by conduit 16 to heating means 75 to be heated therein and passed on to the top of the hot tower 18. In the hot tower there also is a countercurrent of gas for the hot (80°C.) exchange reaction with the liquid, shown passing to tower 18 from 71 and 39, and hot liquid is discharged at 20 at the bottom of the tower and is passed therefrom via conduit 22. The other portion of the cold liquid discharged from the cold tower at 15 passes by conduit 25 from this stage.

No temperature treatment is required for the liquid flow to the cold tower assuming an initial supply at the right temperature, and the liquid supplied to the hot tower is raised in temperature from sources within the system. Additional steam may be drawn upon in connection with stripping of the discharge liquor from hot tower 18 and return of the separated gas to the hot tower 18, whereby the amount of process steam that is still required by the plant to make up for process inefficiencies and to complete the gas heating and humidification as hereinafter explained is thus put to an additional use before it enters the hot tower 18 via 68.

The conditioning of the countercurrent gas (for instance $H_2S$) is attained by this invention with utmost economy. The gas supplied to the cold tower 14 is efficiently cooled and dehumidified and the gas supply to the hot tower 18 is heated and humidified with interchange of energy between these operations. The hot humidified gases which may be required at a following stage are obtained through piping 70 from the hot gases leaving the hot tower 18 via conduit 72, and hot liquor from a following stage returns by piping 39 to the hot tower 18.

An important aspect of the present system is the recovery and use of the low level energy which is available in the cooling and dehumidification of the hot gases leaving the hot tower to condition these gases for countercurrent use in the cold tower. Instead of cooling these hot gases with cooling water and wasting the heated water, the coolant is in part provided from the liquid passing from the cold tower to the hot tower and in part from a flow of liquid circulated in a cyclic treatment reclaiming the heat and using it for heating and humidification of the gas to the hot tower. In the arrangement illustrated the cold gases are simultaneously heated and humidified while the circulating liquor is cooled. The hot humidified gases are passed by pipe 80 into the hot tower 18. The cooled liquor is recirculated to the dehumidifier and cooler 75 to pick up another charge of energy for delivery to the heater and humidifier 78. Inasmuch as the liquid circulates in a closed cycle 75, 77, 78, 89, there is no adverse effect upon the operation of the system. A small amount of make-up water is continuously added via 21 in order to replace that portion which is consumed in humidification of the gas stream. This may conveniently be drawn from the discharge pipe 22 from hot tower 18 or from the feed pipe 12, etc.

To summarize the foregoing, the system of FIG. 1 makes use of a heat transfer cycle involving the pick-up of energy from a hot humidified gas by a liquid stream in a countercurrent direct contact, gas cooler dehumidifier tower and the subsequent liberation of this energy from the liquid to a cold gas stream by an indirect contact countercurrent heat exchange relation.

In this system the cold tower 14 may be extended to include a section 75 at its bottom (or a separate tower) which will serve as the direct contact gas cooler-dehumidifier. The cold liquid from the bottom of the cold tower 14, together with an auxiliary flow via 87 passes countercurrent in 75 in contact with the hot humidified gas from the top of the hot tower 18 and becomes heated as the gas is cooled to the cold tower temperature. The cooled gas via 87 then flows upward through the cold tower 14. The hot liquid from the bottom of said direct contacting section 75 is divided. A portion 71 represented by the main cold tower stream plus added condensate is sent to the hot tower and the balance 77 is sent to a heat exchanger 78 through which indirectly it transfers its energy to a mixture of the cold tower gas and a volume of liquid, e.g. water, from 21, required for humidification, and thus the cold tower gas outflow 79 is simultaneously heated and humidified, as the liquid in 77 is cooled. To make up for inefficiencies of the heat transfer equipment this liquid is further cooled in 100, as required, before returning it to the same direct contacting section 75 via 89. The cooled gases from hot tower 18 which pass into the bottom of cold tower 14 via 87 may be joined there by cold gases brought from a following stage by pipe 90.

The modified cascade system to which the invention is applied to FIG. 2 is shown with two stages. In general, the handling of the flows and the connections of the reactors and stages are similar to corresponding parts of the systems described in my copending parent application, and where applicable the parts in FIG. 2 are in most instances numbered two hundred above the numbers applied to the corresponding parts in FIG. 1 herein. For simplicity, the pumps and valves have been omitted from FIG. 2 and the liquid stream is in full lines and the gas stream in broken lines. The heat exchange relation between the towers of FIG. 2 employs embodiments of corresponding systems of my copending parent application and incorporates the invention of the system of FIG. 1 herein.

A supply of the hot gases from tower 218 on its way to the cold tower 214 is passed into the bottom of direct-contact gas-cooler dehumidifier 275. Into the top section of said dehumidifier 275 is passed a supply of the cold liquid from tower 214 on its way to the hot tower 218 and also into the top of said dehumidifier 275 there is passed an auxiliary cyclic flow of cold liquid from heat exchangers 300, 301. In the dehumidifier 275 the cold liquid passes countercurrent in contact with the hot humidified gas and becomes heated as the gas is cooled to the cold tower temperature. The cooled gas is passed into the bottom of cold tower 214 and joined there by the cold gases brought from the second stage cold tower 228 by pipe 290. The hot liquid leaving the dehumidifier 275, which now consists of the original cold liquid supply from tower 214 plus the original auxiliary cold liquid supply from heat exchanger circuits 301, 300, 275, plus a supply of condensate which has been formed in the process of cooling and dehumidifying the hot gases from tower 218, is divided. A portion representing the said auxiliary supply is returned to heat exchanger 301 where by an indirect contact heat exchange relation it is cooled and transfers energy for heating and humidifying the cold gases passing via conduit 279 from cold tower 214 to hot tower 218. The remaining portion of hot liquid from said dehumidifier is passed into the hot tower 218 and joined there by the hot liquid passing from hot tower 236 via conduit 239. All of the energy from the dehumidifiers of all the stages in this modification is available for humidification and gas heating in the humidifier 278 of the first stage similar to that described for the system of my copending parent application. The second stage receives hot gas direct to hot tower 236 from the preceding stage via 270 so that a humidifier for the second stage is dispensed with. Similarly, cold tower 228 receives cold liquid from the preceding stage via 225. In the countercurrent contact gas-cooler dehumidifier 284, corresponding to the said dehumidifier 275 of the first stage, the gas passing between the hot tower 236 and cold tower 228 is cooled by cold liquid from the cold tower 228 and a circulation from heat exchangers 302, 303. The supply of cold to heat exchanger 303 is drawn by an indirect contact heat exchange relation similar to the first stage through pipe 283 from the gas heater and humidifier 278, and in turn heat is transferred through pipe 282 back to humidifier tower 278 where it joins with the heat transferred from heat exchanger 301 so that a flow of heat energy recovered from the gas cooling and dehumidification from all stages is in circuit with the circulation through humidifier 278 and supplies energy thereto.

Heat exchangers 300 and 302 serve to make up for inefficiencies of the heat transfer equipment and in these exchangers the circulating cold liquid supplied to the dehumidifiers 275 and 284 respectively, is further cooled as required.

The processing of the liquid discharge from 220 of the first stage hot tower in the arrangement shown in FIG. 2 is essentially the same as described for systems of my copending parent application except with regard to the heat energy transferred from the waste discharge flow in the heat exchanger 217. In the system of FIG. 2 a portion of the outflow of cold liquid from humidifier 278 is heated in heat exchanger 217 as the effluent from the stripper heat exchanger 223 is cooled and discharged to waste, and said heated portion is recycled back to the top of humidifier 278 and adds to the heat energy recovered for the heating and humidification of the cold gas passing to the hot tower.

In the system of FIG. 2 the feed is delivered to cold tower 214 through pipe 212 and the enriched stream is withdrawn from the second stage through pipe 240 for further processing. The hot liquid waste from hot tower 218 is treated to recover dissolved gas and heat energy before discharge from the plant. Liquid leaving hot tower 218 via 222 is heated in heat exchanger 223 by the hot liquid discharge from stripper 267. In this exemplary embodiment, steam enters the stripper at 266, passes in direct contact with the heated liquid from 223, leaves via 268 together with a content of the gas stripped from the liquid waste and is passed into the hot tower 218. The gas recycles within the system, passing from cold tower 214 via conduit 279 on its way to heater and humidifier 278 from which it passes into hot tower 218.

The overall process practiced by the illustrative embodiments herein rely on ordinary water as the deuterium source; the gas, hydrogen sulfide, merely acts as an exchange medium and is recycled without being consumed. Make-up gas in small amounts may be supplied preferably at the entrance to the cold tower of the first stage.

The diagrammatic showing and descriptions herein are merely illustrative and descriptive of the plant and process operation and changes in tower height, number of stages, temperature of operation, pressure of operation, the kinds of substances used, the particular isotope to be concentrated, the use of catalysts to enhance rate of isotope exchange, variations of design within a countercurrent temperature exchange and other details may be resorted to within the principle of the invention.

In any system of heat recovery between the fluids entering and either leaving either the hot or cold temperature exchange towers, there may be continuous intimate physical contact only between the fluids entering and leaving, respectively, a single end of the tower. This limitation is necessary to avoid a redistribution of concentrated material from an enriched fluid to a depleted fluid. Accordingly, the system described herein has made use of the very efficient direct intimate contact methods of heat transfer together with the indirect non-contacting methods as required for the systems to which the invention is illustratively applied herein. In the arrangements of FIG. 1 and FIG. 2 the energy available from the gas leaving the hot tower is transferred by direct contact heat exchange to a circulation of liquid, e.g. water, which in turn transfers the energy by at least an indirect contact heat exchange to the gas passing from the cold tower to the hot tower and a quantity of the liquid, whereby there is a simultaneous heating of the gas and vaporizing of the liquid in humidification of the gas.

With the systems of this invention the operating conditions for the illustrative embodiments described are readily attained within moderate ranges of the typical values set forth in the following tabulation:

| | | | |
|---|---|---|---|
| Cold Towers temperature | 15° C. | 20° C. | 35° C. |
| Hot Towers temperature | 70° | 80° | 190° |
| Approx. Operating Pressure (absolute) | 25 psi | 80 psi | 275 psi |
| Gas to liquid ratio in cold tower (mols $H_2S$/mols $H_2O$) | 2.21 | 2.20 | 1.8 |
| Concentration of deuterium in product from final stage | 2% | 2% | 2% |
| Concentration of deuterium in feed water | .0143% | .0143% | .0143% |
| Recovery of deuterium from feed water | 12% | 12% | 21% |

The enrichment at which the product may be removed from the system is not dependent on the operating temperatures alone. It is not limited theoretically, but is determined by physical conditions such as the overall contacting efficiency of the countercurrent towers which in turn is dependent upon the efficiency of the individual bubble plates or contacting members within the towers. For bubble plate towers of the standard design generally obtained, approximately 80 plates per tower would be required for conditions set forth above.

The molar ratios of total gas to total liquid passing countercurrent in each stage of hot and cold towers are determined so that the corresponding operating lines intervene between the equilibrium curves as represented by the effective fractionation factors for each of the said towers. The effective fractionation factor in the illustrative embodiment is the equilibrium ratio of the mol or atom fraction of total deuterium in the gas phase and the mol or atom fraction of total deuterium in the liquid phase at a particular temperature and pressure.

In the design of apparatus employing this invention the relative cross-sectional area of each stage is governed by fluid flows in that stage. The number of theoretical plates in a stage is determined by the fluid flow rates, the extraction efficiency, the desired enrichment and the net enriched fluid removal from that stage. In the application employed for illustration, the concentrations existing at the ends of the towers of each stage are calculated by the mathematical solution of deuterium, water and hydrogen sulfide material balances with allowance for the net deuterium transport to each successive stage of an amount equal to the steady state deuterium extraction from the feed water.

The degree of enrichment and the relative size of a stage are based on economic considerations and such factors as hold up and equilibrium time.

In deuterium concentration effected by use of this system there is also a concentration of the tritium and at a better fractionation factor, the principal equilibria being indicated as follows:

$$THS + H_2O \rightleftharpoons TDO + H_2S$$
$$TDS + HDO \rightleftharpoons TDO + HDS$$

This invention thus provides a practical and highly efficient system for producing a substance (herein exemplified by water) containing a first material (herein exemplified by (D) deuterium) concentrated therein, by exchanging, at two different temperatures, said first material (exemplified by D) with a second material (exemplified by H) between chemically different fluid substances (exemplified by hydrogen sulfide and water) which are physically separable from each other, and which are each capable of containing each of said materials D and H).

While there have been described herein what are at present considered preferred embodiments of the invention, modifications and changes and rearrangements may be made therein without departing from the essence of the invention; the exemplary embodiments are to be taken as illustrative and not restrictive of the invention, the scope of which is defined in the appended claims.

I claim:

1. An improvement of a method of producing a substance containing concentrated therein an isotope of an element by exchanging, at two different temperatures, said isotope with another isotope of the same element between chemically different fluid substances which are physically separable from each other and which are capable of containing each of said isotopes, which method comprises, in combination, the steps of (a) establishing a countercurrent flow of the two substances in a series of at least two pairs of exchange units; (b) mixing said two fluids in each of said exchange units to cause an exchange of isotopes of the element between the two fluids; (c) maintaining a first unit of each pair at a temperature to cause the first fluid flowing therethrough to become enriched and the second fluid flowing therethrough to become impoverished with respect to said isotope; and (d) maintaining the second unit of each pair at a temperature to cause the second fluid flowing therethrough to become enriched and the first fluid flowing therethrough to become impoverished with respect to said isotope; (e) transferring a first part of the flow of enriched first fluid from the first unit of each pair to the second unit of said pair and (f) transferring a second part of the flow of enriched first fluid from the first unit of each pair except the last of said pairs to the first unit of the next succeeding pair; (g) transferring a first part of the flow of enriched second fluid from the second unit of each pair to the first unit of said pair and (h) transferring a second part of said flow of enriched second fluid from the second unit of each pair except the last to the second unit of the next succeeding pair of units; (i) transferring impoverished first fluid from the second unit of each pair of units except the first pair to the second unit of the next preceding pair of units; (j) transferring impoverished second fluid from the first unit of each pair of units except the first pair to the first unit of the next preceding pair of units; (k) delivering a flow of impoverished second fluid to the second unit of a pair of units; and (l) removing as product enriched fluid from the last pair of exchange units of said series; and in which said flows of first fluid are liquid flows; said improvement comprising the combination in said method of the cooperating steps of:

(m) establishing a liquid cyclic flow of enriched first fluid;

(n) passing the liquid cyclic flow of enriched first fluid established in step (m), and a flow of enriched first fluid being transferred from a first unit to a second unit of a pair of units in step (e), into direct contact with enriched second fluid being transferred from a second unit to a first unit of said pair of units in step (g);

(o) maintaining said liquid cyclic flow separated from said flows of second fluid except for the direct contact in step (n); and (p) effecting heat transfer between the liquid cyclic flow of enriched first fluid established in step (m) and the flow of impoverished second fluid being delivered in step (k).

2. An improvement of a method as claimed in claim 1, wherein the second fluid is a gas.

3. An improvement of a method as claimed in claim 2, in which the temperature maintained in the second unit of each pair of units is higher than the temperature maintained in the first unit of said pair; said improvement further comprising the combination in said method of the cooperating step of:

(g) introducing a quantity of first fluid into the second fluid being delivered in step (k), which quantity is vaporized into the second fluid in step (p).

4. An improvement of a method as claimed in claim 3, wherein the first fluid is water and the second fluid is hydrogen sulfide.

5. An improvement of a method as claimed in claim 1, wherein the first fluid is water.

6. An improvement of a method as claimed in claim 1, wherein the second fluid is hydrogen sulfide.

7. An improvement of a method as claimed in claim 3, wherein said quantity of first fluid in step (q) is impoverished first fluid discharged from the second unit of said first pair of units.

8. An improvement of a method as claimed in claim 3, wherein said quantity of first fluid in step (q) is first fluid drawn from the source of the first fluid flow to the first unit of said first pair of units.

9. An improvement of a method as claimed in claim 1, further comprising:

(q) establishing a liquid cyclic flow of impoverished first fluid, (r) heating the liquid cyclic flow of impoverished first fluid established in step (q) in an indirect contact heat exchange with a flow of impoverished first fluid from the second unit of said first pair of units, and (s) effecting heat transfer between said heated liquid cyclic flow of impoverished first fluid and the flow of second fluid being delivered in step (k).

10. An improvement of a method as claimed in claim 9, wherein said impoverished first fluid flow in step (r) after leaving said second unit of said first pair of units is heated prior to said indirect contact heat exchange of step (r).

* * * * *